(12) United States Patent
Xanthos et al.

(10) Patent No.: US 10,623,132 B2
(45) Date of Patent: Apr. 14, 2020

(54) BARRAGE JAMMER WITH CONTOURED AMPLITUDE

(71) Applicants: James A Xanthos, Fulton, MD (US); John S Cooper, Jr., Melbourne Beach, FL (US)

(72) Inventors: James A Xanthos, Fulton, MD (US); John S Cooper, Jr., Melbourne Beach, FL (US)

(73) Assignee: J3 TECHNOLOGY LLC, Indialantic, FL (US)

( * ) Notice: Subject to any disclaimer, the term of this patent is extended or adjusted under 35 U.S.C. 154(b) by 131 days.

(21) Appl. No.: 15/913,211

(22) Filed: Mar. 6, 2018

(65) Prior Publication Data
US 2019/0280800 A1    Sep. 12, 2019

(51) Int. Cl.
*H04K 3/00* (2006.01)
*H04W 48/04* (2009.01)

(52) U.S. Cl.
CPC ............. *H04K 3/43* (2013.01); *H04K 3/42* (2013.01); *H04K 3/45* (2013.01); *H04K 3/62* (2013.01); *H04K 2203/16* (2013.01); *H04K 2203/36* (2013.01); *H04W 48/04* (2013.01)

(58) Field of Classification Search
CPC .. H04K 3/42; H04K 3/43; H04K 3/45; H04K 3/62; H04K 2203/16; H04K 2203/36; H04W 84/04
See application file for complete search history.

(56) References Cited

U.S. PATENT DOCUMENTS

| | | | |
|---|---|---|---|
| 4,103,236 A | 7/1978 | Desemo et al. | |
| 4,217,550 A | 8/1980 | Blassel et al. | |
| 4,264,909 A | 4/1981 | Hamilton et al. | |
| 4,342,119 A | 7/1982 | Seidl | |
| 5,623,266 A | 4/1997 | Grigsby | |
| 6,765,473 B1 * | 7/2004 | Pavatich | G07C 9/00182 340/13.26 |
| 7,095,779 B2 | 8/2006 | Karlsson | |
| 7,099,369 B2 | 8/2006 | Karlsson | |
| 7,126,979 B2 | 10/2006 | Karlsson | |
| 7,738,890 B1 | 6/2010 | Shull | |
| 8,175,512 B2 | 5/2012 | Cornwell | |
| 8,195,094 B1 * | 6/2012 | Briskman | H04B 1/034 455/42 |
| 8,521,169 B2 | 8/2013 | Brisebois et al. | |
| 8,543,053 B1 | 9/2013 | Melamed et al. | |
| 9,258,078 B2 | 2/2016 | Kang et al. | |

(Continued)

*Primary Examiner* — Dominic E Rego

(57) ABSTRACT

The present invention is a barrage jammer with contoured amplitude and an associated method for barrage jamming with contoured amplitude.
In a standard prior art barrage jammer, the amplitude of the RF signal is independent from the ambient spectral environment.
Alternatively, in a barrage jammer according to the current invention, the ambient spectral environment is detected, processed, and a contoured amplitude plan is developed based on the ambient environmental spectrum data. The barrage jammer transmit signal is transmitted in accordance with the contour amplitude plan.
The invention is particularly useful when deployed in a Managed Access Service (MAS) system or as a jamming system. In particular, such a system can be used in a facility (such as a prison, school, government building, etc) to prevent cellphone usage.

20 Claims, 4 Drawing Sheets

(56) References Cited

U.S. PATENT DOCUMENTS

| | | |
|---|---|---|
| 9,749,085 B2 | 9/2017 | Coleman et al. |
| 9,860,014 B2 | 1/2018 | Mead Gill et al. |
| 9,887,768 B1* | 2/2018 | Thommana .............. H04B 1/06 |
| 2004/0036022 A1* | 2/2004 | Gore .................... G01N 21/552 250/339.12 |
| 2008/0113638 A1* | 5/2008 | Curtin ................ H04B 17/0085 455/226.1 |
| 2008/0211481 A1* | 9/2008 | Chen .................... H03J 1/0091 324/76.22 |
| 2009/0058361 A1* | 3/2009 | John .................... A61N 1/3785 320/128 |
| 2012/0171677 A1* | 7/2012 | Ludowise ............ C12Q 1/6851 435/6.11 |
| 2014/0274132 A1* | 9/2014 | Abdelmonem ....... H04L 5/0026 455/456.2 |
| 2014/0275850 A1* | 9/2014 | Venkatraman ....... A61B 5/0002 600/301 |
| 2016/0179281 A1* | 6/2016 | Krah .................... G06F 3/0416 345/173 |
| 2018/0115185 A1* | 4/2018 | John .................. A61N 1/37252 |
| 2018/0144714 A1* | 5/2018 | Khorasani ................ G09G 5/02 |

\* cited by examiner

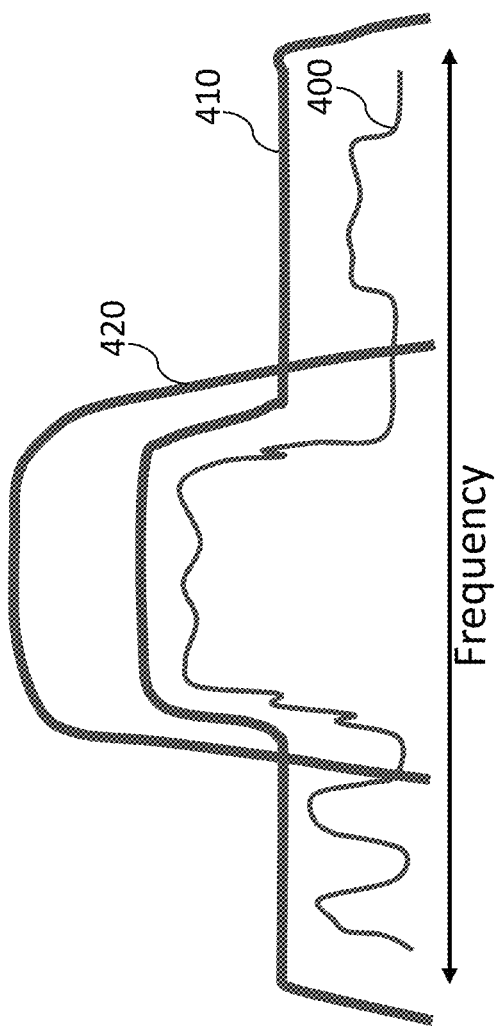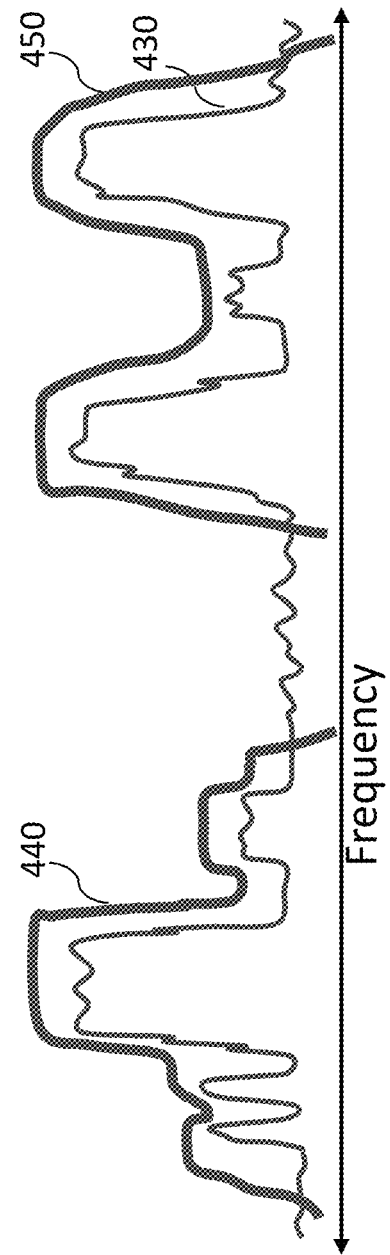
Fig. 3a
Fig. 3b

BARRAGE JAMMER WITH CONTOURED AMPLITUDE

CROSS-REFERENCES TO RELATED APPLICATIONS

None.

BACKGROUND OF THE INVENTION a) Field of the Invention

The invention relates to a barrage jammer with contoured amplitude and an associated method for barrage jamming with contoured amplitude.

b) Description of Related Art

Wireless devices are widely used in today's society. One of the most common wireless devices is the cellphone, but there are a variety of other examples such as cordless phones, walkie talkies, tablets, radios, etc.

The art of jamming wireless devices has been known for a long time. It initially was applicable to military communications, but has now gained greater traction in the civilian arena.

In order to jam wireless devices, there is a definition of the target area for the affected wireless devices as well as the area where the jammer should not have an impact. Although jamming is not an exact science, the goal is to deliver a dominant amount of RF jamming power within the target area while trying to minimize the bleed of this power in the area where the jammer should not have an impact. In the military arena, this bleed is typically not as important as it is in the civilian arena. For civilian purposes, the bleed of RF signals outside the target jamming area is typically as important as the delivery of jamming power within the target area.

There are three general jamming techniques that have been used in the prior art.

The first technique is called "spot jamming" and it utilizes a CW or slightly spread signal that targets the frequency used by the wireless device for communication. This form of jamming is fairly easy to implement, but has fallen out of favor because it is easy to defeat using either frequency hopping or direct sequence spread spectrum techniques.

The second technique is called "barrage jamming" and it utilizes jamming of the entire band (or bands) that the target wireless device can use for communication. There are two basic problems with barrage jamming. First, it is very inefficient because it spreads the RF power across the entire communication band rather than focusing it on the frequencies used by the target wireless device. Second, it exacerbates the bleed problem because all of the power unnecessarily delivered in the band (outside of the target wireless device frequency) will unnecessarily bleed and possibly affect other wireless devises outside of the target area.

The third technique is called "targeted jamming" and it uses advanced RF or sophisticated radio techniques to more precisely target the wireless device. An example of the RF approach is disclosed in U.S. Pat. No. 9,258,078 which teaches the use of beam forming techniques to direct the jamming signal to the target while reducing its impact in other areas. An example of the sophisticated radio approach is disclosed in U.S. Pat. No. 9,749,085 which teaches the use of a Software Defined Radio (SDR) to detect the target communication signals and produce similar signals to spoof the receiver on the target device.

The problem with the targeted jamming approaches is that in order to solve the problems with barrage jamming, these new approaches require a great deal of additional complexity as well as the associated costs.

What is needed is a better way to perform barrage jamming that addresses the problems of inefficient spectral targeting as well as bleed.

SUMMARY OF THE INVENTION

The object of the invention is to provide a barrage jammer with contoured amplitude and an associated method for barrage jamming with contoured amplitude.

In a standard prior art barrage jammer, the amplitude of the RF signal is independent from the ambient spectral environment. There are several methods for generating this standard barrage jammer spectrum. A CW signal can be swept across the target band at a fast rate. This technique is referred to as chirped CW. In another method, a noise signal can be simultaneously produced across the target band. The noise can either be random noise or pseudo-random noise.

Alternatively, in a barrage jammer according to the current invention, the ambient spectral environment is detected, processed, and a contoured amplitude plan is developed based on the ambient environmental spectrum data. The barrage jammer transmit signal is transmitted in accordance with the contour amplitude plan.

The invention can be used in a facility (such as a prison, school, government building, etc) to prevent cellphone usage. Frequently, a Distributed Antenna System (DAS) may be used as part of a MAS system in a prison facility and the present invention can be used in conjunction with the DAS.

The object is attained in a preferred embodiment of the invention having a barrage jammer comprising a receiver for detecting an ambient spectral environment in a target frequency band, a processor for processing the ambient spectral data and developing a contoured amplitude plan for barrage jamming based on the ambient spectral environment data, and at least one transmitter for transmitting barrage jamming RF power in accordance with the contoured amplitude plan.

In a further embodiment of the invention, a method for barrage jamming comprises the steps of: Detecting an ambient spectral environment data in a target frequency band; Processing the ambient spectral environment data; Developing a contoured amplitude plan for barrage jamming based on the ambient spectral environment data; and Transmitting barrage jamming RF power in accordance with the contoured amplitude plan.

Advantageous embodiments of the invention, with useful features and improvements of the invention, are described in more detail below.

BRIEF DESCRIPTION OF THE DRAWINGS

The invention is described in detail below by way of preferred embodiments shown in the drawings.

FIGS. 3a & 3b are drawings showing possible contour amplitude maps of a barrage jammer according to the current invention with two contour maps in the same target frequency band and two contour maps in different target frequency bands respectively;

DETAILED DESCRIPTION OF THE PREFERRED EMBODIMENTS

Referring to FIGS. 1-4, a barrage jamming apparatus and method with contoured amplitude will now be described with several preferred embodiments. It is understood that the embodiments described herein do not limit the scope of the invention, but merely provide examples of the present invention as used in several different instances.

Figure 1A:
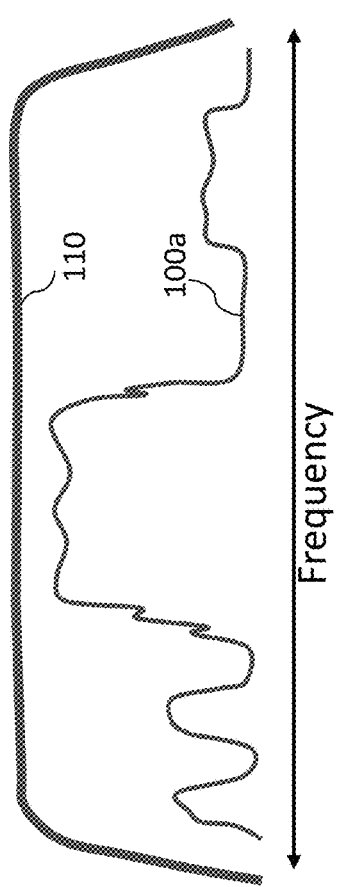
FIG. 1a is a drawing showing the contour of a standard barrage jammer according to the prior art.

FIG. 1a shows the spectrum for the ambient spectral environment 100a compared with a barrage jammer transmit spectrum 110 according to the prior art.

Figure 1B:
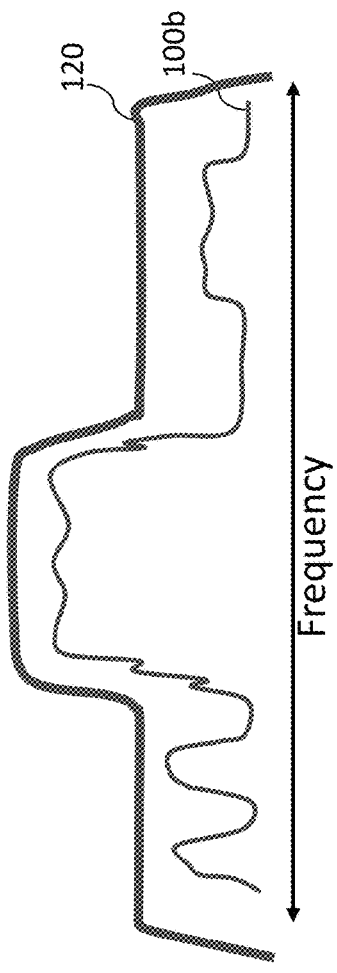
FIGS. 1b & 1c are drawings showing possible contour maps of a barrage jammer according to the current invention.

In contrast, FIG. 1b shows the spectrum for the ambient spectral environment 100b compared with a barrage jammer transmit spectrum 120 with contoured amplitude according to a preferred embodiment of the present invention. The contour amplitude plan for the barrage jammer is determined by detecting the ambient spectral environment in the target frequency band, processing the ambient spectral environment data, developing a contoured amplitude plan for barrage jamming based on the ambient spectral environment data, and transmitting barrage jamming RF power in accordance with the contoured amplitude plan.

Figure 1C:
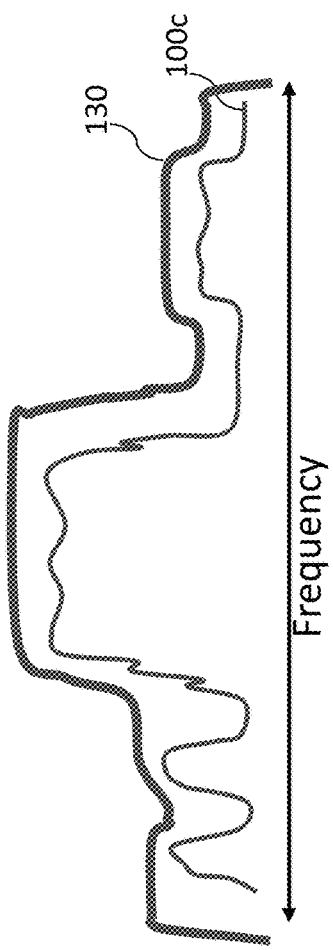

FIG. 1c shows the spectrum for the ambient environment 100c compared with a barrage jammer transmit spectrum 130 with contoured amplitude according to another embodiment of the present invention.

The contours of the barrage jammer transmit spectra 120 & 130 in FIGS. 1b & 1c show two different approaches for the contoured amplitude plan. In FIG. 1b, the highest level signal causes the barrage jammer transmit spectrum 120 to go to one level and all of the other signals cause the barrage jammer transmit spectrum 120 to go to another level which is lower. Alternatively, in FIG. 1c, the barrage jammer transmit spectrum 130 follows a contour amplitude plan which has multiple levels in order to more closely follow the levels in the ambient environment 100c.

The use of a contoured amplitude plan as taught in the present invention and shown in FIGS. 1b & 1c addresses the problems of inefficient spectral targeting as well as bleed in the prior art barrage jamming. The efficiency improvement occurs because of the ability to focus power on the target frequencies of interest. The bleed improvement occurs because the amount of power is lowered to more accurately match the amount needed for the various target frequencies within the target frequency band.

These contour maps are shown for illustrative purposes, and it is well known to those skilled in the art that there are many types of contour amplitude maps that can be used successfully for barrage jamming according to the current invention.

Figure 2:
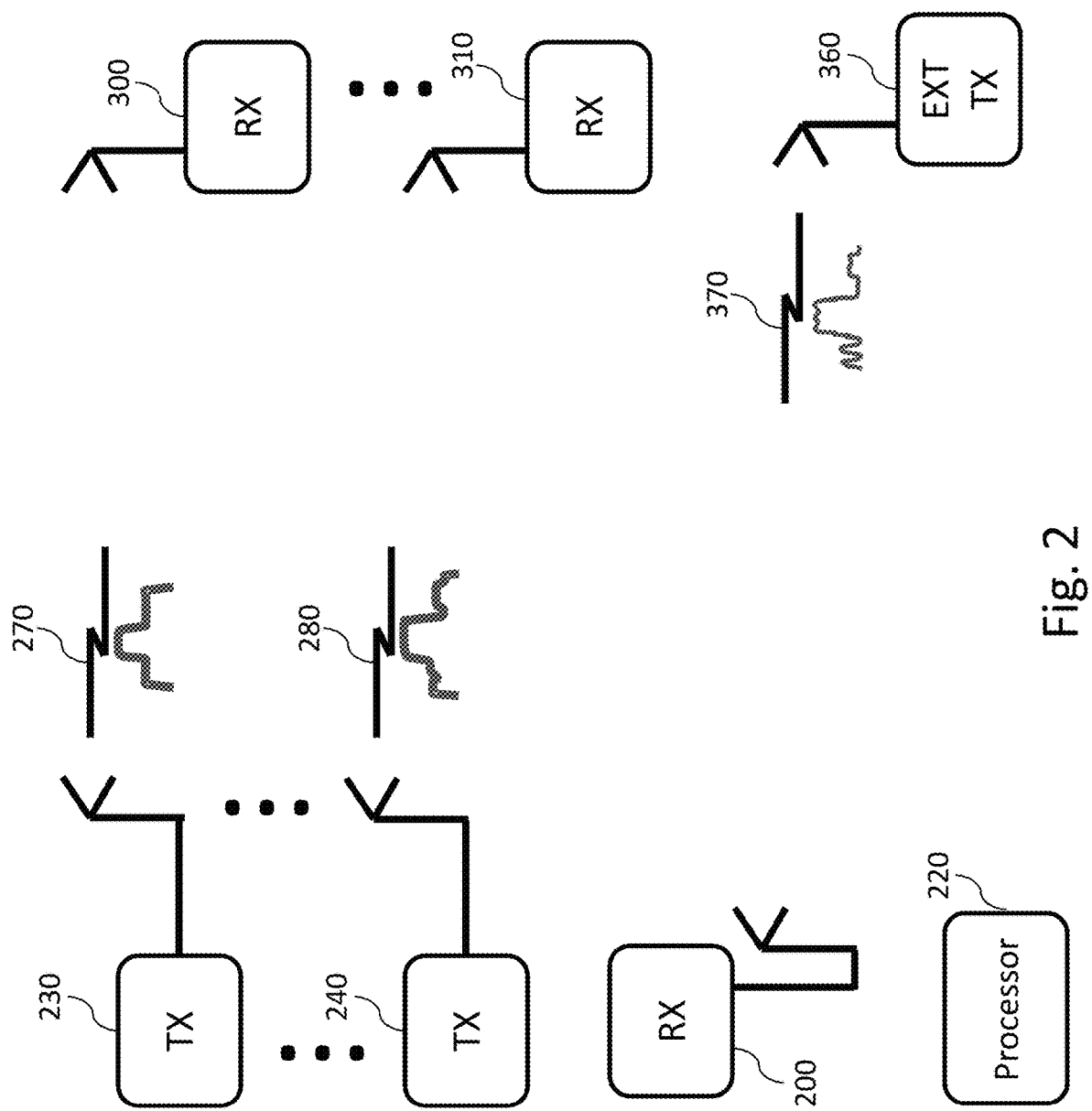
FIG. 2 shows a barrage jammer including a receiver, a processor, and at least one transmitter for transmitting barrage jamming RF power in accordance with a contoured amplitude plan.

FIG. 2 shows a barrage jammer comprising a receiver 200 for detecting an ambient spectral environment 370 in a target frequency band that is transmitted from an external transmitter 360. It additionally includes a processor 220 for processing the ambient spectral data 370 and developing a contoured amplitude plan for barrage jamming based on the ambient spectral environment data, and at least one transmitter 230 & 240 for transmitting barrage jamming RF power 270 & 280 in accordance with the contoured amplitude plan. The barrage jamming RF power 270 & 280 is received by at least one target receiver 300 & 310 and dominates ambient spectral data 370.

Receiver 200 can be implemented in a variety of ways by those skilled in the art, for example, using a spectrum analyzer, scanner, etc. In accordance with one preferred embodiment of the invention, the receiver 200 can be used to receive barrage jamming RF power 270 & 280 in order to monitor the operation of transmitters 230 & 240.

The transmitters 230 & 240 for transmitting barrage jamming RF power 270 & 280 in accordance with the contoured amplitude plan can be used in a variety of ways. For example, transmitter 230 and 240 can transmit using the same contour amplitude map in the same target band, can use different contour amplitude maps in the same target bands, can use different contour amplitude maps in different target bands, etc. Additionally, a single transmitter 230 can be used to transmit multiple contour amplitude maps in more than one target frequency band.

The transmitters 230 & 240 for transmitting barrage jamming RF power 270 & 280 in accordance with the contoured amplitude plan can be also be implemented in a variety of ways. For example, they can use a chirped CW signal or use noise (either random or pseudo-random).

In another embodiment of the invention, the transmitters 230 & 240 are part of a MAS system that is used in a targeted facility such as a prison.

The processor 220 can be implemented in a variety of ways including, but not limited to, a microcontroller, a controller board, an embedded computer, a computer, a networked computer, or cloud-based computing.

FIGS. 3a & 3b show possible contour amplitude maps of a barrage jammer according to the current invention with two contour maps in the same frequency band and two contour maps in different frequency bands respectively.

FIG. 3a shows the ambient spectral environment 400 in a single target band with the barrage jammer transmit spectrum following at least two contour amplitude plans 410 and 420 in the same band. In the illustrated example, the contour amplitude plan 420 may be desired in order to increase the amount of power delivered to the largest ambient signal within the ambient spectral environment 400.

FIG. 3b shows the ambient spectral environment 430 in two target bands with the barrage jammer transmit spectrum following at least two contour amplitude plans 440 and 450 in the each band respectively. In the illustrated example, the contour amplitude plan 440 covers the lower target frequency band of ambient spectral environment 430 and contour amplitude plan 450 covers the upper target frequency band of ambient spectral environment 430. It is understood by those of skill in the art that contour amplitude plans 440 & 450 can either be produced by a single transmitter or multiple transmitters.

Figure 4:
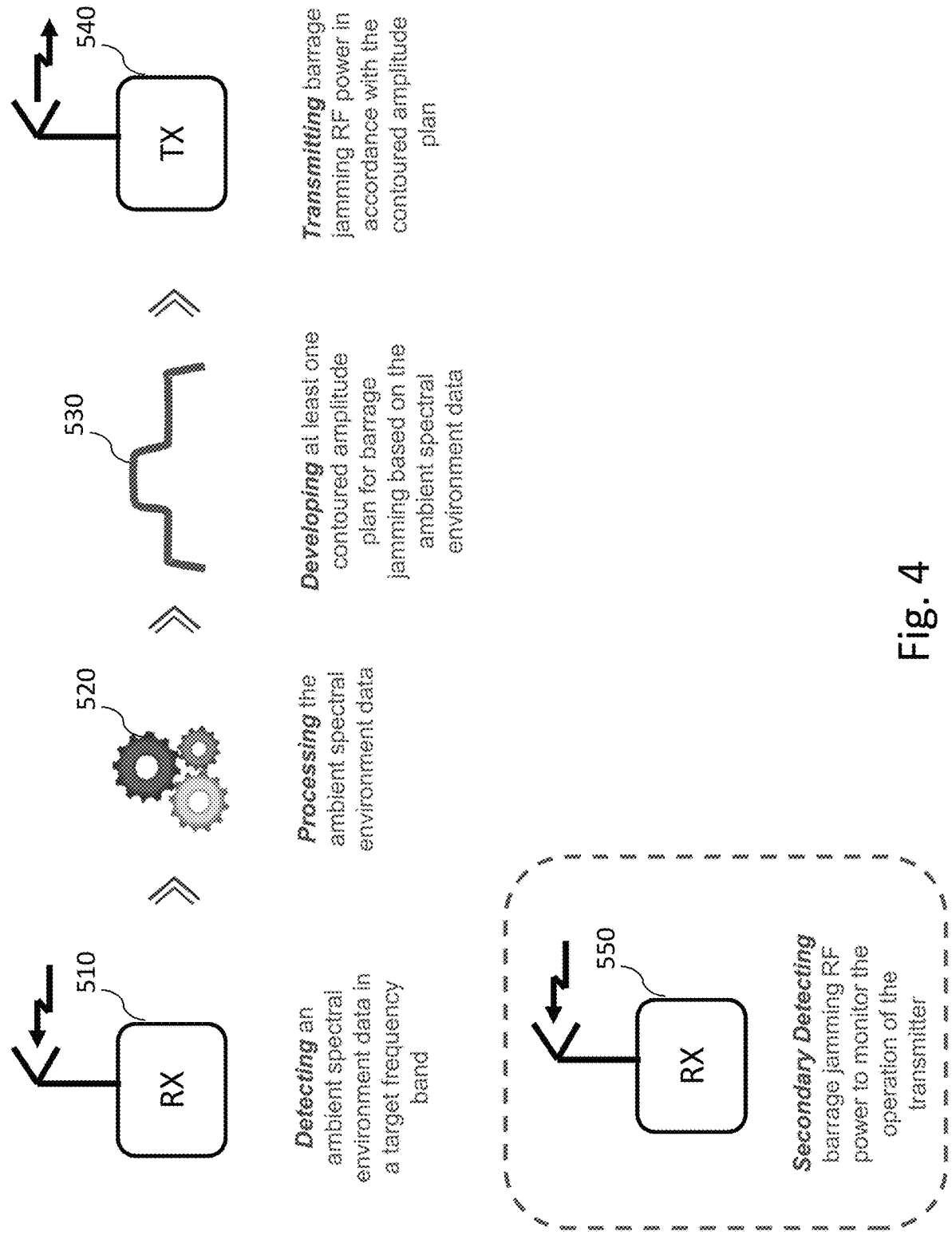
FIG. 4 shows a method for barrage jamming using a contoured amplitude plan based on ambient spectral environmental data according to the invention.

FIG. 4 shows a method for barrage jamming comprising the steps of: Detecting 510 an ambient spectral environment in a target frequency band; Processing 520 the ambient spectral environment data; Developing 530 at least one contoured amplitude plan for barrage jamming based on the ambient spectral environment data; and Transmitting 540 barrage jamming RF power in accordance with the contoured amplitude plan.

The step of detecting 510 can be implemented with a receiver. The receiver can be implemented in a variety of ways by those skilled in the art, for example, using a spectrum analyzer, scanner, etc.

In accordance with one preferred embodiment of the invention, a secondary detecting 550 step can be added in order to detect the barrage jamming RF power to monitor the operation of the transmitter.

The steps of processing 520 and developing 530 can be implemented in a variety of ways including, but not limited to, a microcontroller, a controller board, an embedded computer, a computer, a networked computer, or cloud-based computing.

The step of transmitting 540 can be implemented in a variety of ways. For example, more than one transmitter can transmit using the same contour amplitude map in the same target band, can use different contour amplitude maps in the same target bands, can use different contour amplitude maps in different target bands, etc. Additionally, a single transmitter can be used to transmit multiple contour amplitude maps in more than one target frequency band.

The transmitters for transmitting barrage jamming RF power in accordance with the contoured amplitude plan can also be implemented in a variety of ways. For example, they can use a chirped CW signal or use noise (either random or pseudo-random).

In another embodiment of the invention, the transmitters are part of a MAS system that is used in a targeted facility. Such a system can be used in a prison environment in order to disable contraband cellphones. Frequently, a Distributed Antenna System (DAS) may be used as part of a MAS system in a prison facility and the present invention can be used in conjunction with the DAS.

While the present invention has been shown and described with reference to a number of preferred embodiments, it is well known to those of skill in the art that the invention may be practiced otherwise than as specifically disclosed and claimed herein.

For example, although some of the TX and RX antennas are shown as separate antennas, it is well known by those of the ordinary skill in the art that the same effect can be accomplished with a single antenna for TX and RX that uses a diplexer to separate signals.

What is claimed is:

1. A barrage jammer with contoured amplitude comprising:
    a receiver for detecting an ambient spectral data in at least one target frequency band that is transmitted from at least one external transmitter;
    a processor for processing the ambient spectral data and developing at least one contoured amplitude plan for barrage jamming based on the ambient spectral data; and
    at least one transmitter for transmitting barrage jamming RF power in accordance with the contoured amplitude plan.

2. A barrage jammer with contoured amplitude according to claim 1, wherein the barrage jamming RF power is a chirped CW signal.

3. A barrage jammer with contoured amplitude according to claim 1, wherein the barrage jamming RF power is a noise signal.

4. A barrage jammer with contoured amplitude according to claim 1, wherein the barrage jammer is part of a MAS system.

5. A barrage jammer with contoured amplitude according to claim 1, wherein the barrage jammer is used to control unwanted cellphones in a facility.

6. A barrage jammer with contoured amplitude according to claim 5, wherein the facility is a prison.

7. A barrage jammer with contoured amplitude according to claim 1,
    wherein the processor develops multiple contoured amplitude plans for barrage jamming based on the ambient spectral data; and
    wherein the at least one transmitter transmits barrage jamming RF power in accordance with the multiple contoured amplitude plans.

8. A barrage jammer with contoured amplitude according to claim 7, wherein at least two of the multiple contoured amplitude plans are in a single target frequency band.

9. A barrage jammer with contoured amplitude according to claim 7, wherein the multiple contoured amplitude plans are in multiple target frequency bands.

10. A barrage jammer with contoured amplitude according to claim 1, wherein the receiver additionally receives the barrage jamming RF power to monitor the operation of the transmitters.

11. A method for barrage jamming performed by a jammer comprising the steps of:
    Detecting an ambient spectral environment data in a target frequency band;
    Processing the ambient spectral environment data;
    Developing at least one contoured amplitude plan for barrage jamming based on the ambient spectral environment data; and
    Transmitting barrage jamming RF power in accordance with the contoured amplitude plan.

12. A method for barrage jamming according to claim 11 wherein the barrage jamming RF power is a chirped CW signal.

13. A method for barrage jamming according to claim 11 wherein the barrage jamming RF power is a noise signal.

14. A method for barrage jamming according to claim 11 wherein the step of transmitting barrage jamming RF power is done in a MAS system.

15. A method for barrage jamming according to claim 11 wherein the step of transmitting barrage jamming RF power is done to control unwanted cellphones in a facility.

16. A method for barrage jamming according to claim 15 wherein the facility is a prison.

17. A method for barrage jamming according to claim 11
    wherein the step of developing includes multiple contoured amplitude plans; and
    wherein the step of transmitting includes barrage jamming RF power in accordance with the multiple contoured amplitude plans.

18. A method for barrage jamming according to claim 17 wherein at least two of the multiple contoured amplitude plans are in a single target frequency band.

19. A method for barrage jamming according to claim 17 wherein at least two of the multiple contoured amplitude plans are in multiple target frequency bands.

20. A method for barrage jamming according to claim 11 further comprising the step of secondary detecting barrage jamming RF power to monitor the operation of the step of transmitting barrage jamming RF power.

* * * * *